(12) United States Patent
Tamaki et al.

(10) Patent No.: US 6,537,057 B2
(45) Date of Patent: Mar. 25, 2003

(54) MOLD CLAMPING APPARATUS FOR INJECTION MOLDING MACHINE

(75) Inventors: Masahiro Tamaki, Shizuoka-Ken (JP); Jun Koike, Shizuoka-Ken (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/906,767

(22) Filed: Jul. 18, 2001

(65) Prior Publication Data

US 2001/0048954 A1 Dec. 6, 2001

Related U.S. Application Data

(62) Division of application No. 09/144,341, filed on Aug. 31, 1998, now Pat. No. 6,270,333.

(30) Foreign Application Priority Data

Aug. 29, 1997 (JP) .............................................. 9-234937

(51) Int. Cl.⁷ .............................................. B29C 45/64
(52) U.S. Cl. ........................ 425/590; 425/593; 425/595
(58) Field of Search ................................ 425/589, 590, 425/593, 595

(56) References Cited

U.S. PATENT DOCUMENTS

| | | | | |
|---|---|---|---|---|
| 2,259,781 A | | 10/1941 | Ebina ........................ 425/149 |
| 3,606,641 A | | 9/1971 | Carrieri et al. ............. 425/595 |
| 3,669,599 A | | 6/1972 | Snider et al. ............. 425/451.9 |
| 3,729,283 A | | 4/1973 | Eggenberger et al. ....... 425/595 |
| 3,924,986 A | | 12/1975 | Suler ........................ 425/451.2 |
| 3,927,711 A | | 12/1975 | Fisher et al. ............. 425/451.2 |
| 4,230,442 A | | 10/1980 | Rees et al. .................. 425/595 |
| 4,273,524 A | * | 6/1981 | Smith .......................... 425/595 |
| 4,304,540 A | | 12/1981 | Hammon .................... 425/595 |
| 4,744,740 A | | 5/1988 | Kojima ........................ 425/595 |
| 4,874,309 A | | 10/1989 | Kushibe et al. ............. 425/595 |
| 5,061,175 A | * | 10/1991 | Iwamoto ...................... 425/589 |
| 5,066,217 A | | 11/1991 | Fukuzawa et al. .......... 425/595 |
| 5,110,283 A | | 5/1992 | Buml et al. .................. 425/595 |
| 5,188,850 A | | 2/1993 | Hirata et al. ................. 425/595 |
| 5,336,462 A | | 8/1994 | Wohlrab ...................... 425/595 |
| 5,378,141 A | | 1/1995 | Aoki ........................... 425/595 |
| 5,773,050 A | | 6/1998 | Wohlrab ...................... 425/595 |
| 5,849,225 A | | 12/1998 | Ebina .......................... 425/149 |

* cited by examiner

Primary Examiner—James P. Mackey
(74) Attorney, Agent, or Firm—Pillsbury Winthrop LLP

(57) ABSTRACT

A mold clamping apparatus for an injection molding machine comprises a stationary platen fixedly holding the stationary mold, a movable platen fixedly holding the movable mold and disposed opposite to the stationary platen, tie bars for guiding the movable platen for movement toward and away from the stationary platen, a movable platen driving mechanism for moving the movable platen along the tie bars to close and open the mold, a movable platen fixing mechanism for fixing the movable platen to the tie bars at a set position immediately before a position where the movable mold is joined to the stationary mold, and a clamping force applying mechanism that includes a sealed hydraulic cylinder actuator capable of converting energy of a hydraulic fluid into an intensified mold clamping force and of applying the intensified mold clamping force to the stationary platen. In one embodiment, the apparatus includes an electrically driven toggle mechanism which brings the movable and stationary molds together, at which point the hydraulic clamping force applying means applies significant clamping force to clamp the mold shut.

4 Claims, 10 Drawing Sheets

MOLD CLAMPING APPARATUS FOR INJECTION MOLDING MACHINE

This is a Divisional of National Application Ser. No. 09/144,341 filed Aug. 31, 1998, now issued as U.S. Pat. No. 6,270,333 on Aug. 7, 2001 the entire contents of which is hereby incorporated by reference.

BACKGROUND OF THE INVENTION

1. Field of the Invention

The present invention relates to a mold clamping mechanism for an injection molding machine and, more specifically, to improvements in a mold clamping apparatus for injection molding machine, provided with a means for intensifying mold clamping force.

2. Description of the Related Art

In a generally known mold clamping mechanism, a movable platen is moved to clamp a mold between a stationary platen and the movable platen. The mold clamping mechanism is capable of keeping the mold closed by a high clamping force against the pressure of a molten polymer injected into the mold. Straight hydraulic mold clamping mechanisms have prevalently been used for clamping a mold. Straight hydraulic mold clamping mechanisms include those of a boost ram system employing a hydraulic cylinder actuator having a cylinder, and a ram internally provided with a boost ram and axially slidably fitted in the cylinder, those of a side cylinder system employing a plurality of side cylinders in addition to a clamping cylinder and those of a pressure intensifying cylinder system employing a clamping hydraulic cylinder actuator and a pressure intensifying hydraulic cylinder actuator connected in series to the clamping cylinder. These known straight hydraulic mold clamping mechanisms need a clamping hydraulic cylinder actuator having a large capacity and a complicated hydraulic circuit to open and close the mold quickly and to provide a sufficient mold clamping force, and a tank for storing the hydraulic fluid for operating the hydraulic cylinder actuator. The straight hydraulic mold clamping mechanisms of the boost ram system and the side cylinder system, in particular, need a large highpressure pump to exert a high clamping force on the mold, and the straight hydraulic mold clamping mechanisms of the pressure intensifying system has a relatively great longitudinal size.

A mold clamping mechanism disclosed in JPB2 No. 17851/1989 is provided with a screw mechanism and a cylinder actuator in combination. This mold clamping mechanism is provided with a first doubleacting cylinder actuator having a doubleacting ram, and first and second pressure chambers, the volumes of which vary equally as the doubleacting ram moves, and a second doubleacting cylinder actuator having a pressure intensifying chamber. The first doubleacting cylinder actuator operates for opening and closing a mold with the first and the second pressure chamber communicating with each other. When clamping the mold, the first and the second pressure chamber are disconnected from each other, and the pressure in the pressure intensifying chamber is increased by the screw mechanism to drive the second doubleacting cylinder actuator. A hydraulic fluid is transferred from the first or the second pressure chamber to the second or the first pressure chamber by a pump to advance or retract the doubleacting ram when opening or closing the mold. Therefore, any additional tank for reserving the hydraulic fluid is not necessary.

A known electric driven mold clamping mechanism is provided with a screw feed device which is driven by an ac servomotor to move a moveable platen. In this electric driven mold clamping mechanism, it is unavoidable that the ac servomotor must be of a large capacity and the screw feed device must be of a large size to exert a sufficiently high mold clamping force on the mold.

From the point of view, a prior art mold clamping mechanism disclosed in JPA No. 246806/1994 is provided with an improved servomotor as a driving source and an improved screw feed mechanism. This prior art mold clamping mechanism is provided with a pressure intensifying mechanism which pressures a hydraulic fluid contained in a sealed bag with a threaded rod having one end linked to an internally threaded nut rotated by a servomotor to produce a high mold clamping force. This pressure intensifying mechanism, however, is not reliable in surely holding the mold clamping force due to the leakage of the hydraulic fluid from the sealed bag.

SUMMARY OF THE INVENTION

Accordingly, it is an object of the present invention to provide a simple, compact mold clamping apparatus having a high degree of freedom of design.

Another object of the present invention is to provide a mold clamping apparatus capable of surely and properly holding a mold clamping force when increasing pressure, of preventing the leakage of a hydraulic fluid and of smoothly supplying the hydraulic fluid.

According to a forst aspecg of the present invention, a mold clamping apparatus for an injection molding machine, for closing and opening a mold including a stationary mold and a movable mold and for clamping the closed mold, said mold clamping apparatus comprises: a stationary platen fixedly holding the stationary mold;

- a movable platen fixedly holding the movable mold and disposed opposite to the stationary plate; tie bars of connecting the movable platen to the stationary platen in a manner that the movavle platen moves toward and away from the stationary platen;
- a movable platen driving means for moving the movable platen along the tie bars to close and open the mold; a movable platen fixing means for fixing the movable platen to the tie bars at a set position immediately before a position where the movable mold is closed; and
- a clamping force applying means having sealed hydraulic cylinder actuators capable of converting energy of a hydraulic fluid into an intensified mold clamping force and of applying the intensified mold clamping force to the stationary platen.

According to a second aspect of the present invention, a mold clamping apparatus for an injection molding machine, for closing and opening a mold including a stationary mold and a movable mold and for clamping the closed mold, said mold clamping apparatus comprises:

- a stationary platen fixedly holding the stationary mold;
- a movable platen fixedly holding the movable mold and disposed opposite to the stationary platen; tie bars for connecting the movable platen to the stationary platen in a manner that the movable platen moves toward and away from the stationary platen;
- a movable platen driving means for moving the movable platen along the tie bars to close and open the mold; a rear mount plate disposed behind the movable platen and connected to the tie bars;
- a mold clamping ram extended between the rear mount plate and the movable platen to exert a mold clamping force on the movable platen; and a clamping force applying means having a sealed hydraulic cylinder actuator capable of converting energy of a hydraulic fluid into an intensified mold clamping force and of applying the intensified mold clamping force to the mold clamping ram.

According to a third aspect of the present invention, a mold clamping apparatus for an injection molding machine, for closing and opening a mold including a stationary mold and a movable mold and for clamping the closed mold, said mold clamping apparatus comprises: a stationary platen fixedly holding the stationary mold;

a movable platen fixedly holding the movable mold and disposed opposite to the stationary platen; tie bars for connecting the movable platen in a manner that the moveable platen moves toward and away from the stationary platen;

an intermediate mount plate disposed behind the movable platen and movable along the tie bars; a rear mount plate fixedly disposed behind the intermediate mount plate; toggle mechanisms interconnecting the intermediate mount plate and the rear mount plate to move the intermediate mount plate forward and backward along the tie bars;

a mold clamping ram extended between the intermediate plate and the movable platen to exert a mold clamping force on the movable platen; and a clamping force applying means having a sealed hydraulic cylinder actuator capable of converting energy of a hydraulic fluid into an intensified mold clamping force and of applying the intensified mold clamping force to the mold clamping ram.

BRIEF DESCRIPTION OF THE DRAWINGS

The above and other object, features and advantages of the present invention will become more apparent from the following description taken in connection with the accompanying drawings, in which.

DESCRIPTION OF THE PREFERRED EMBODIMENTS

First Embodiment

Figure 1:
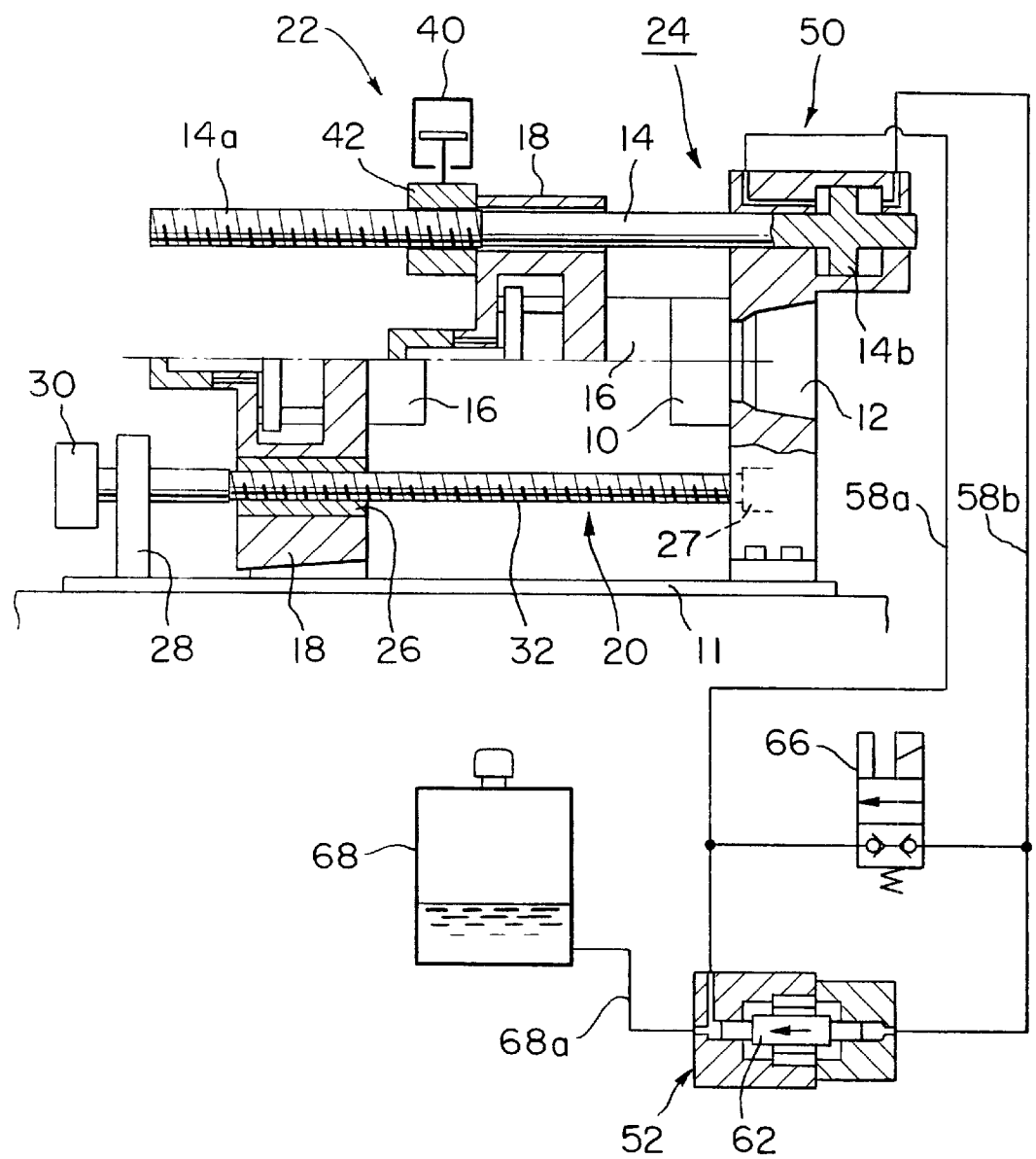
FIG. 1 is a schematic sectional view of a mold clamping apparatus in a first embodiment according to the present invention for an injection molding machine.

Referring to FIG. 1 showing a mold clamping apparatus in a first embodiment according to the present invention, a stationary mold 10 of an injection mold is attached to a stationary platen 12 fixed to a base 11. A movable mold 16 of the mold is attached to a movable platen 18 disposed opposite to the stationary platen 12 an the base 11. The movable platen 18 is guided for forward and backward movement by tie bars 14 extended from the stationary platen 12. A movable platen driving unit 20 drives the movable platen 18 for forward movement to close the mold and for backward movement to open the mold. A movable platen fixing unit 22 fixes the movable platen 18 to the tie bars 14 at a predetermined position immediately before a position where the movable mold 16 is joined to the stationary mold 10 to close the mold. A hydraulic intensifying unit 24 intensifies clamping force to be exerted on the movable mold 16 after the moveable mold 16 has been moved to the stationary mold 10 together.

Figure 2:
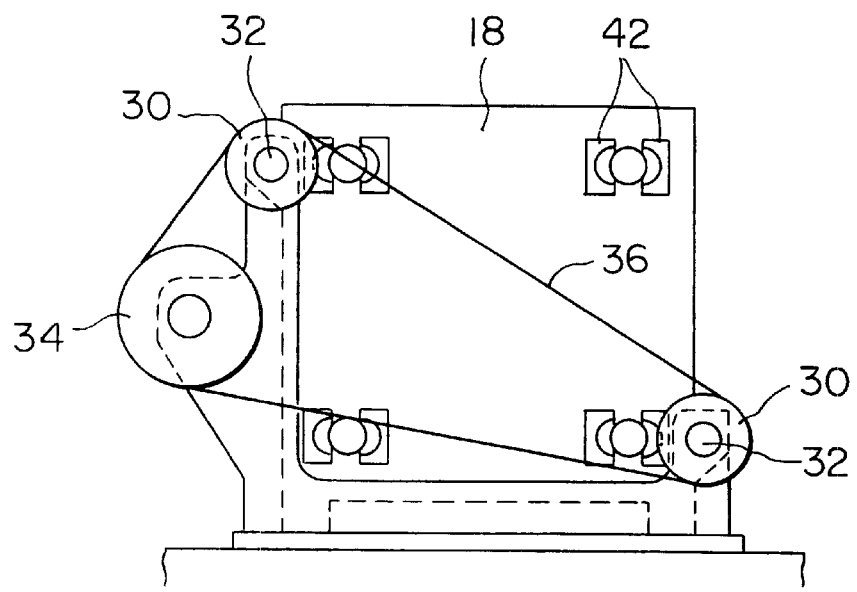
FIG. 2 is a schematic view of a driving mechanism included in a movable platen driving unit included in the mold clamping mechanism shown in FIG. 1.

Two threaded rods 32 (FIG. 2) extend through the movable platen 18, and each has one end supported for rotation in a bearing 27 on the stationary platen 12. Internally threaded nuts 26 are fixed to the movable platen 18 with threaded rods 32 extending through them to form ball screw mechanisms, respectively. The other end of each threaded rod 32 is supported in a bearing on a mount plate 28. As shown in FIG. 2, the two threaded rods 32 are driven by a servomotor 34. A driven pulley is mounted on the output shaft of the servomotor 34, driven pulleys 30 are mounted respectively on the end of the threaded rods 32, and a synchronous belt 36 is wound around the driven pulley and the driven pulleys 30 to transmit the output torque of the servometer 34 to the threaded rods 32. The rotation of each threaded rod 32 is converted into a straight-line motion by the ballscrew mechanism to move the movable platen 18 forward and backward on the base 11 along the bars 14.

Figure 3:
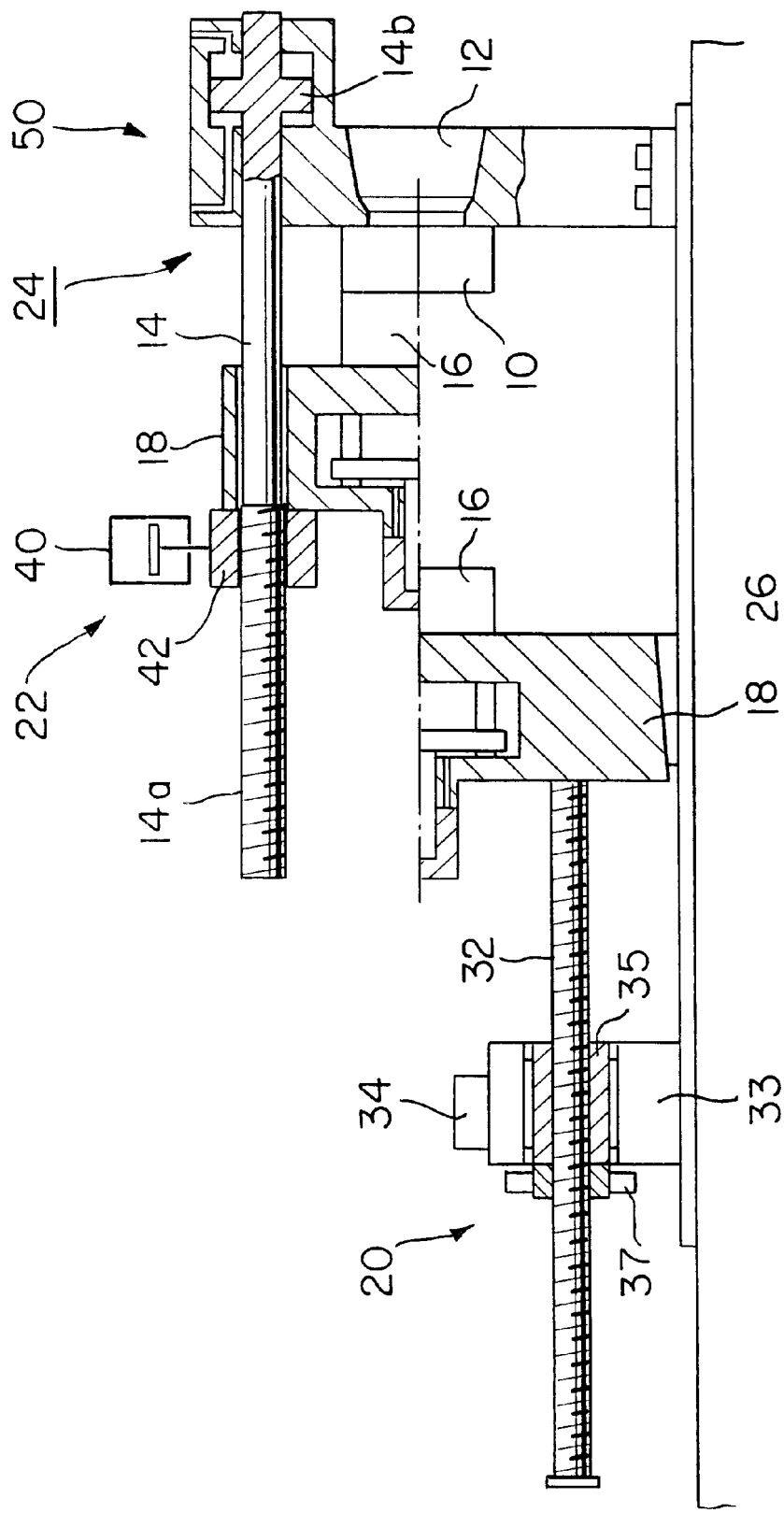
FIG. 3 is a schematic sectional view of a mold clamping apparatus having another type of the movable platen driving unit.

The ball screw mechanisms for the movable platen driving mechanism 20 may be substituted by ball screw mechanisms shown in FIG. 3. The ball screw mechanisms involves a threaded rod 32, which has one end supported on the movable platen 18. A nut 35 having a threaded bore is supported for rotation on a mount plate 33 disposed behind the movable platen 18. The nut 35 is restrained from axial movement and linked to the threaded rod 32. A driven pulley 37 is fixedly combined with the nut 35. The driven pulley 37 may be driven for rotation by a servomotor provided on the mount plate 33. A drive pulley similar to the one shown in FIG. 2 is mounted on the output shaft of the servomotor 34 and a synchronous belt wound around the drive pulley and the driven pulley 37 to rotate the nuts 35. The nut 35 drive the treaded rod 34 to move in the axial direction so that the movable platen 18 moves forward and backward along the tie bars 14.

Movable Platen Fixing Unit 22

Each tie bar 14 has a threaded section 14a in a predetermined length. Half nuts 42 are supported on the back surface of the movable platen 18, and is engaged with the threaded sections 14a of the tie bars 14. The half nuts 42 are adapted to be operated by cylinder actuators 40. The cylinder actuators 40 tighten the half nuts 42 to fasten the movable platen 18 fixedly to the tie bars 14 and loosen the half nuts 42 to release the movable platen 18 from the tie bars 14.

Clamping force applying Unit 24

Figure 4:
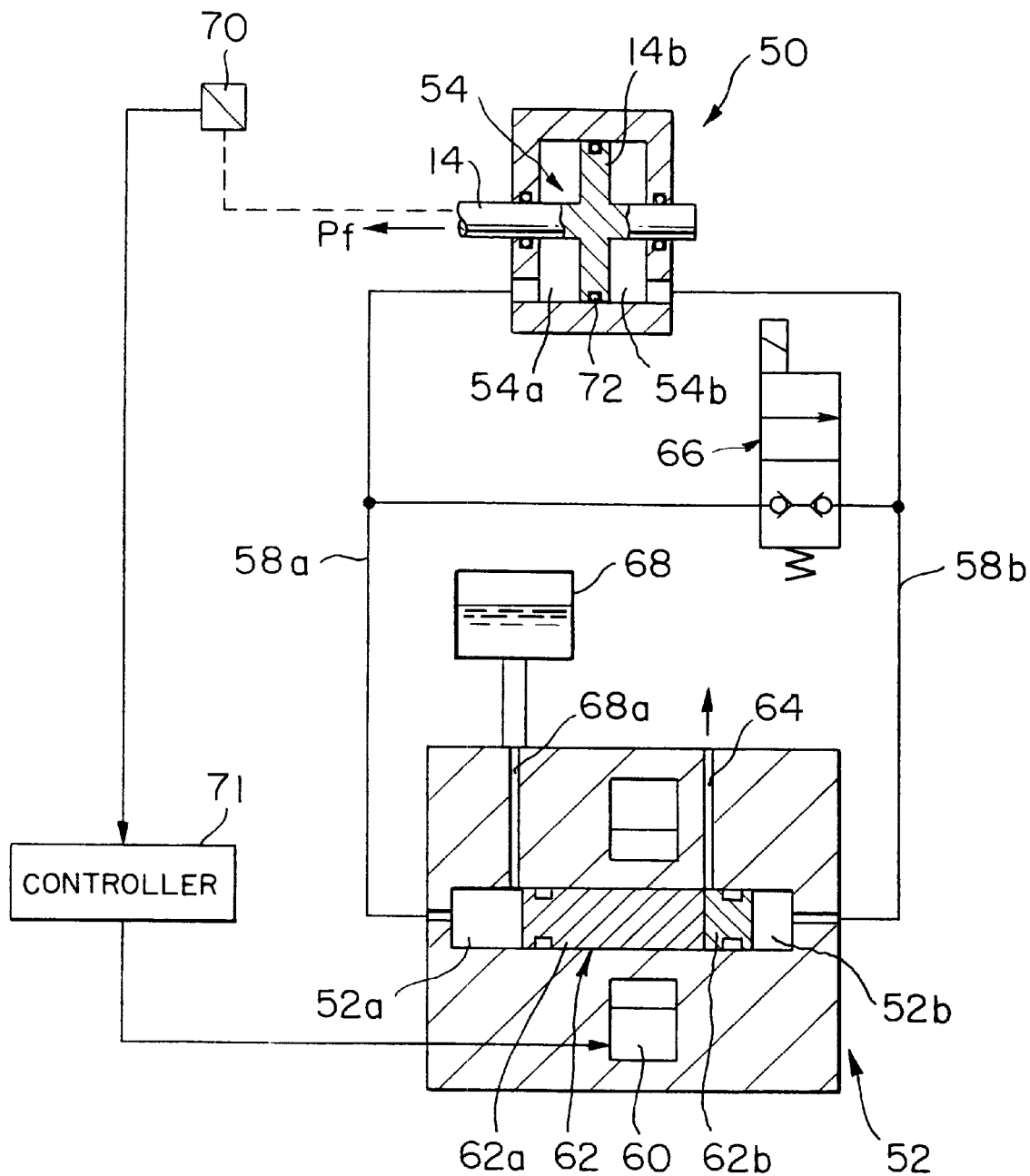
FIG. 4 is an enlarged typical view of a pressure controller included in a clamp force applying unit included in the mold clamping apparatus shown in FIG. 1.

Referring to FIGS. 1 and 4, the clamping force applying unit 24 comprises, as basic components, sealed hydraulic cylinder actuators 50 connected respectively to the tie bars 14, a pressure controller 52, and a hydraulic circuit including a nonleakage valve 66. Each of the sealed hydraulic cylinder actuators 50 has a cylinder provided with a cylinder bore 54, a piston 14b filled in the cylinder bore so as to divide the bore 54 into a first pressure chamber 54a and a second pressure chamber 54b, and piston rods connected to the piston 14b so as to extend on the opposite sides of the piston 14b. The piston rod extending through the first pressure chamber 54a is connected to the tie bar 14.

The pressure controller 52 has a body 55 provided with a cylindrical chamber in which a pressure applying member 62 is disposed movably. The pressure applying member 62 divides the cylindrical chamber into a pressure chamber 52a and a back pressure chamber 52b. The pressure chamber 52a is communicated with the first pressure chamber 54a through a hydraulic line 58a and the back pressure chamber 52b is communicated with the second pressure chamber 54b through a hydraulic line 58b. The pressure controller 52 controls pressures in the first pressure chamber 54a and the second pressure chamber 54b which exert on the opposite sides of the piston 14b. The sectional area of the piston 14b which is greater than that of the pressure applying member 62 is large enough to produce a mold clamping force. Therefore, the piston 14b converts a hydraulic pressure into a desired intensified mechanical force to clamp the mold. This mechanical force is transmitted to pull the tie bar 14 and serves as the mold clamping force.

The pressure applying member 62 consists of a first member 62a and a second member 62b. The first member 62a is an induction member serving as a secondary conductive member driven by a linear motor 60. The first member 62a and second member 62b are disposed in an axial arrangement, and the first member 62a is capable to take an independent movement.

The body 55 of the pressure controller 52 is provided with a passage 64 having one end opening into the back pressure chamber 52b and the other end opening into the atmosphere.

In the case where the pressure applying member 62 is a single member, when the pressure applying member 62 is moved for pressure intensifying action to the left, a negative pressure producted in the back pressure chamber 52b, whereby a negative pressure is produced in the second pressure chamber 54b connected to the back pressure chamber 52b by the line 58b. Therefore, air and external dust may possibly be sucked into the second pressure chamber 54b the sealed hydraulic cylinder actuator 50.

Since the pressure applying member 62 consists of the two member 62a and 62b, and the first member 62a driven by linear motor 60 is acting independently, any negative pressure is produced in a space behind the second member 62b. Moreover, even if the second member 62b is moved to the left due the hydraulic liquid introduced to the back pressure chamber 52b from the second pressure chamber 54b, the back pressure chamber 52b is brought open into the atmosphere through the passage 64. Any negative pressure is not produced in the back pressure chamber 52b and second pressure chamber 54b, thereby preventing dust from being sucked into the second pressure chamber 54b.

A nonleakage valve 66 is provided in a hydraulic line communicating the first pressure chambers 54a and second pressure chamber 54b. The nonleakage valve 66 is controlled by control signals for the selective connection and disconnection of the pressure chambers 54a and 54b.

A sealing member 72, such as on O ring, is placed in an annular groove in the circumference of the piston 14b to ensure the liquid-tight contact between the piston 14b and the cylinder of the sealed hydraulic cylinder actuator 50. If the hydraulic fluid on the first pressure chamber 52a leaks into the second pressure chamber 52b through the sealing member 72, the nonleakage valve 66 is opened to allow the hydraulic fluid to flow from the second pressure chamber 54b into the first pressure chamber 54a.

The hydraulic circuit shown in FIG. 4 must be replenished with the hydraulic fluid if the hydraulic fluid leaks through the sealing member 72 fitted on the piston 14b. A reservoir tank 68 containing the hydraulic fluid is installed which supply the hydraulic fluid to the hydraulic circuit through a supply passage 68a when necessary. The hydraulic fluid is supplied into the pressure chamber 52a and the line 58a immediately before the pressure intensifying action commences.

The pressure Pr of the hydraulic fluid supplied into the first pressure chamber 54a of the sealed hydraulic cylinder actuator 50 is magnified in proportion to the sectional area of the piston 14b to produce a mold clamping force Pf exerted on the tie bar 14. The pressure Pr of the hydraulic fluid (or the mold clamping force Pf) is measured by a pressure sensor 70. The pressure sensor 70 gives a pressure signal expressing the measured pressure Pr to a linear motor controller, and then the linear motor controller controls the linear motor 60 so that the pressure of the hydraulic fluid is maintained at a set pressure.

In operations for closing the mold, the threaded rods 32 are driven for rotation by the servomotor 34 to advance the movable pattern 18 toward the stationary platen 12 so that the movable mold 16 moves quickly to the stationary mold 10. When the movable mold 16 is on the point of stopping against the stationary mold 10, the actuators 40 of the moveable platen fixing unit 22 tighten the movable platen 18 at the set position. As soon as the movable platen 18 is fixed, the linear motor 60 of the pressure controller 52 is actuated to move the pressure applying member 62a for pressure intensifying action. The pressure applying member 62a increases the pressure in the first pressure chamber 54a in which the pistons 14b moves forward together with the tie bars 14, pulling the tie bars 14 to clamp the movable mold 16 and the stationary mold 10 firmly together.

Thus, the clamping force applying unit 21 is capable of always exerting the predetermined mold clamping force on the tie bar 14 and of smoothly replenishing the hydraulic circuit with the hydraulic fluid in case the hydraulic fluid leaks.

According to the mold clamping apparatus of the embodiment, quick and smooth closing operation of the mold is easily achieved and the mold is maintained stably in a clamped state while injection phase.

Figure 5:
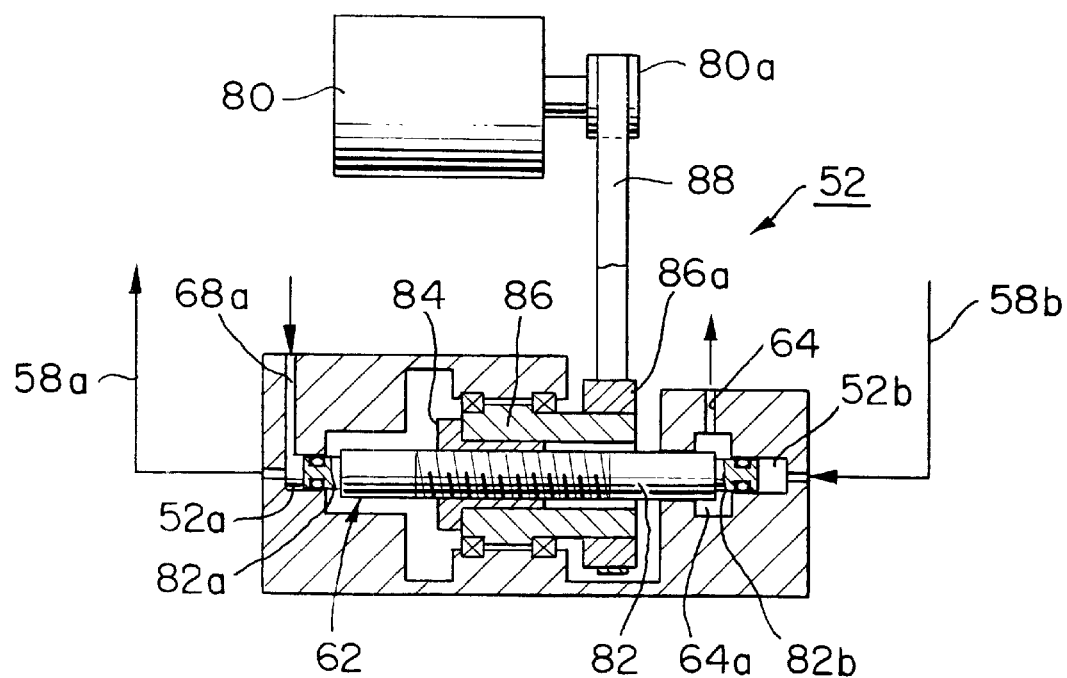
FIG. 5 is an enlarged typical view of a modification of the pressure controller included in the clamp force applying unit, shown in FIG. 4.

FIG. 5 shows a pressure controller 52 in a modification of the pressure controller 52 of the pressure intensifying unit 24 shown in FIG. 4. As shown in FIG. 5, the pressure controller 52 employs a servomotor 80 instead of the built-in linear motor 60 employed in the pressure controller 52 shown in FIG. 4.

Referring to FIG. 5, a pressure applying member 62 has a threaded section 82, and two piston sections 82a and 82b formed at the opposite ends of the threaded section 82. The piston sections 82a and 82b are fitted in a pressure chamber 52a and a back pressure chamber 52b, respectively. An internally threaded nut 84 is mounted on and linked to the threaded section 82 of the pressure applying member 62 and is driven for rotation by a servomotor 80 to move the pressure applying member 62. The internally threaded nut 84 is inserted in and coupled with a rotating member 86, and a driven pulley 86a is mounted on the rotating member 86. A drive pulley 80a is mounted on the output shaft of the servomotor 80 and a synchronous belt 88 is wound around the drive pulley 80a and the driven pulley 86a to drive the rotating member 86 for rotation together with the internally threaded nut 84. In FIG. 5, indicated at 64a is an open chamber for preventing a negative pressure from generating, which is led to be communicated with the atmosphere by means of an opening 64.

The function of the pressure applying member 62 is entirely the same as that of the driving mechanism shown in FIG. 4

Second Embodiment

Figure 6:
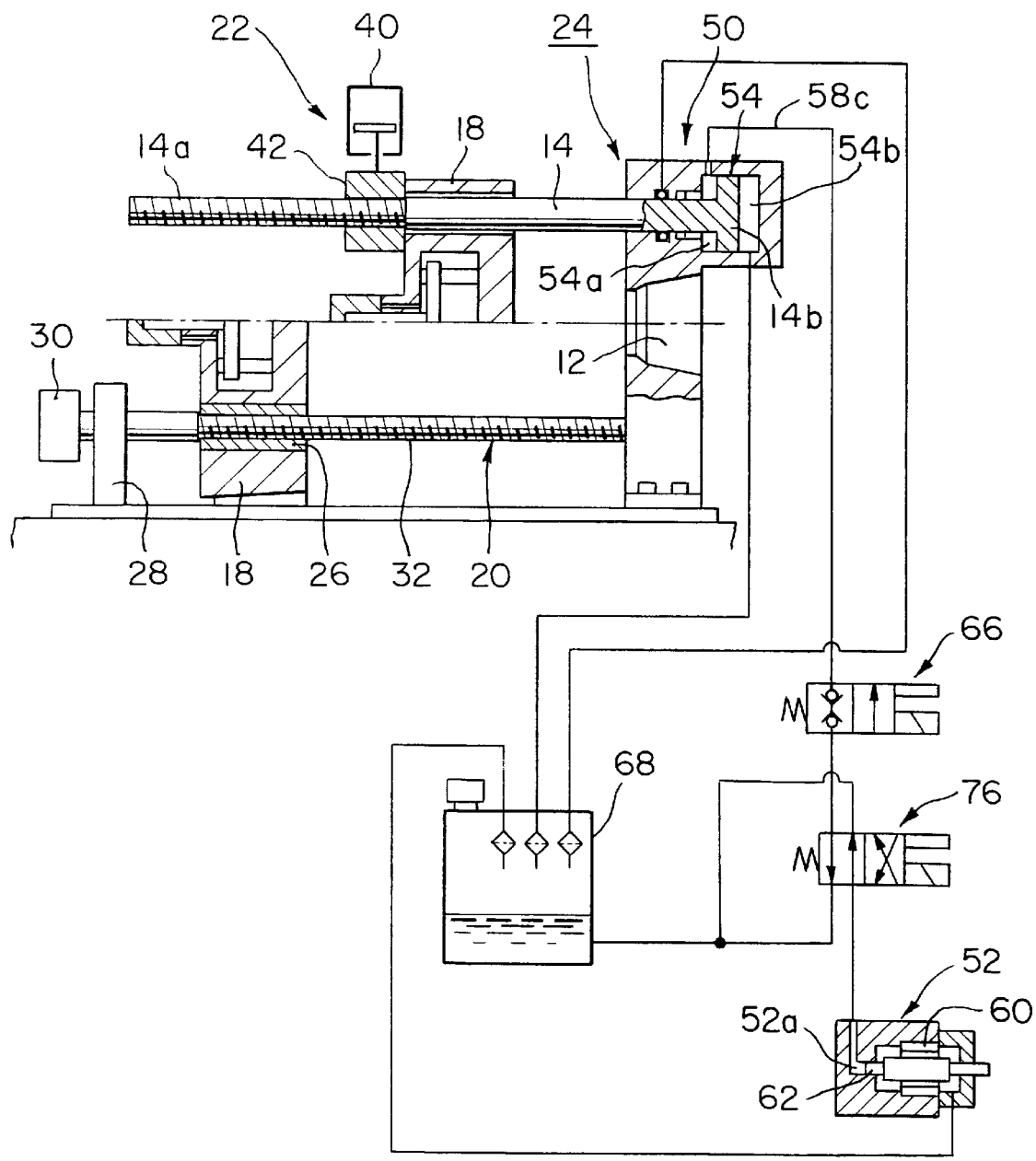
FIG. 6 is a schematic sectional view of a mold clamping apparatus in a second embodiment according to the present invention for an injection molding machine.
Figure 7:
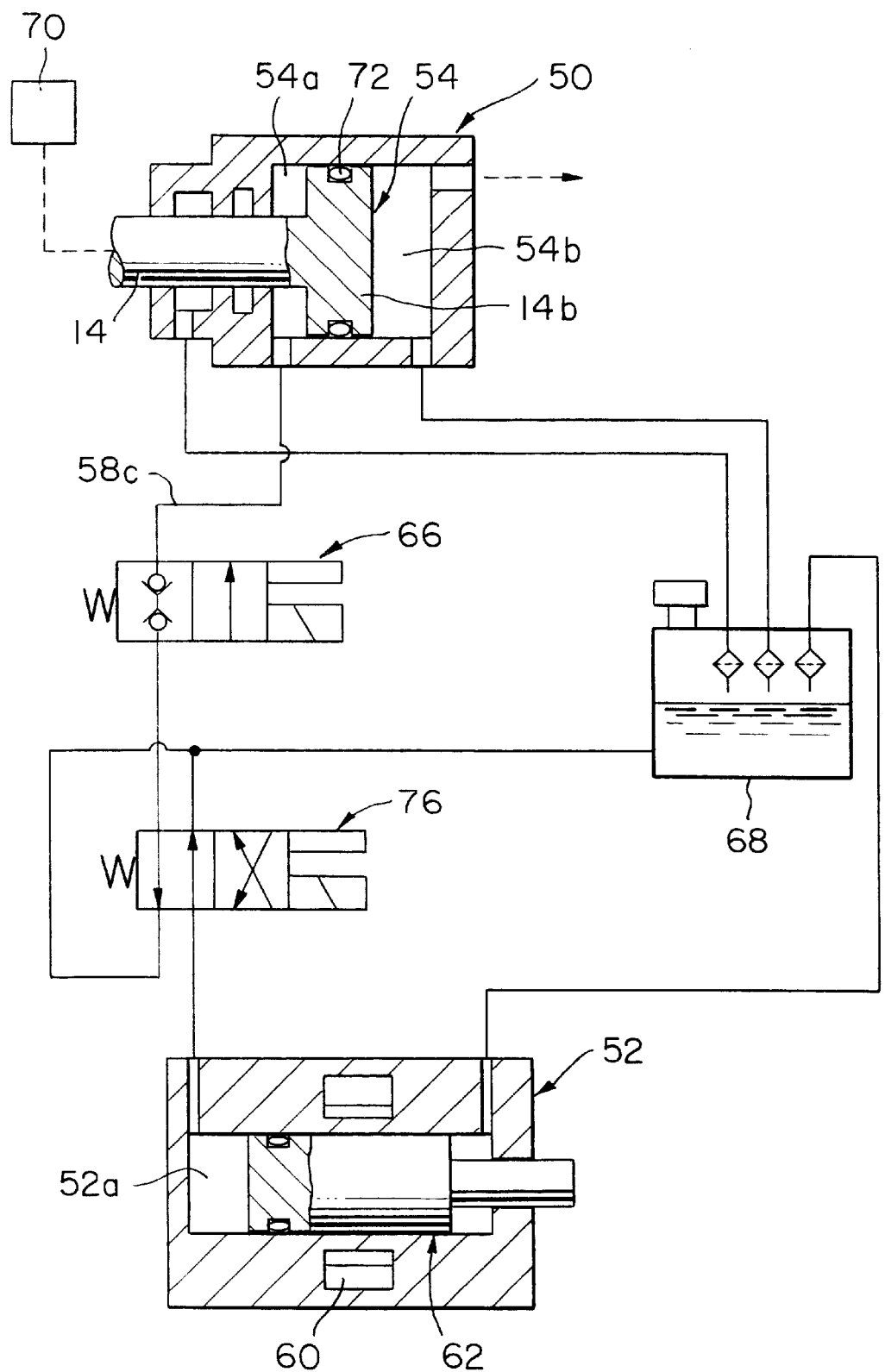
FIG. 7 is an enlarged diagrammatic view of a pressure controller included in a clamping force applying unit included in the mold clamping mechanism shown in FIG. 6.

In a mold clamping mechanism in a second embodiment according to the present invention shown in FIG. 6 and FIG. 7, each of sealed hydraulic cylinder actuators 50 has an open chamber 54b opening into the atmosphere in place of the pressure chamber 54b in the first embodiment.

The mold clamping apparatus in the second embodiment has a clamping force applying unit 24 comprising sealed hydraulic cylinder actuators 50, a pressure controller 52, and a hydraulic circuit including a nonleakage valve 66 and a directional control valve 76. Each of the sealed hydraulic cylinder actuators 50 has a cylinder provided with a cylinder bore 54, and a piston 14b fitted in the cylinder bore 54 of the cylinder so as to divide the cylinder bore 54 into a pressure chamber 54a and the open chamber 54b opening into the atmosphere. A line 58c provided with a nonleakage valve 66 and a directional control valve 76 is connected to the pressure chamber 54a. The line 58c can be connected through the directional control valve 76 to a pressure chamber 52a formed in a cylinder included in the pressure controller 52 and to a reservoir tank 68.

A pressure applying member 62 is fitted on the first pressure chamber 52a of the pressure controller 52. The pressure applying member 62 is driven to move axially by a linear motor 60.

The operation of the clamping force applying unit 34 will be described in connection with the operation for clamping the mold.

When clamping the mold, the directional control valve 76 and the nonleakage valve 66 are set in an open position for communicating the pressure chamber 52a of the pressure controller 52 with the pressure chamber 54a of the sealed hydraulic cylinder actuator 50. The pressure applying member 62 of the pressure controller 52 is moved axially to the left to increase the hydraulic pressure in the pressure chamber 54a. The increased hydraulic pressure exerts to the piston 14b having a large pressure receiving area. The piston 14b converts the hydraulic pressure into a high mechanical clamping force applying to the tie bar 14.

When holding the mold in a clamping state, the directional control valve 76 and the nonleakage valve 66 are set in an closed position for disconnecting the pressure chamber 52a from the pressure chambers 54a to a maintain the hydraulic pressure acting on the piston 14b.

When releasing the clamping force, the directional control valve 76 is kept in the closed position and the nonleakage valve 66 is set in the open position to communicate the pressure chamber 52a, 54a with the reservoir tank 68. Consequently, the pressure in the pressure chamber 54a is relieved and the hydraulic fluid is supplied into the pressure chamber 52a.

Figure 8:
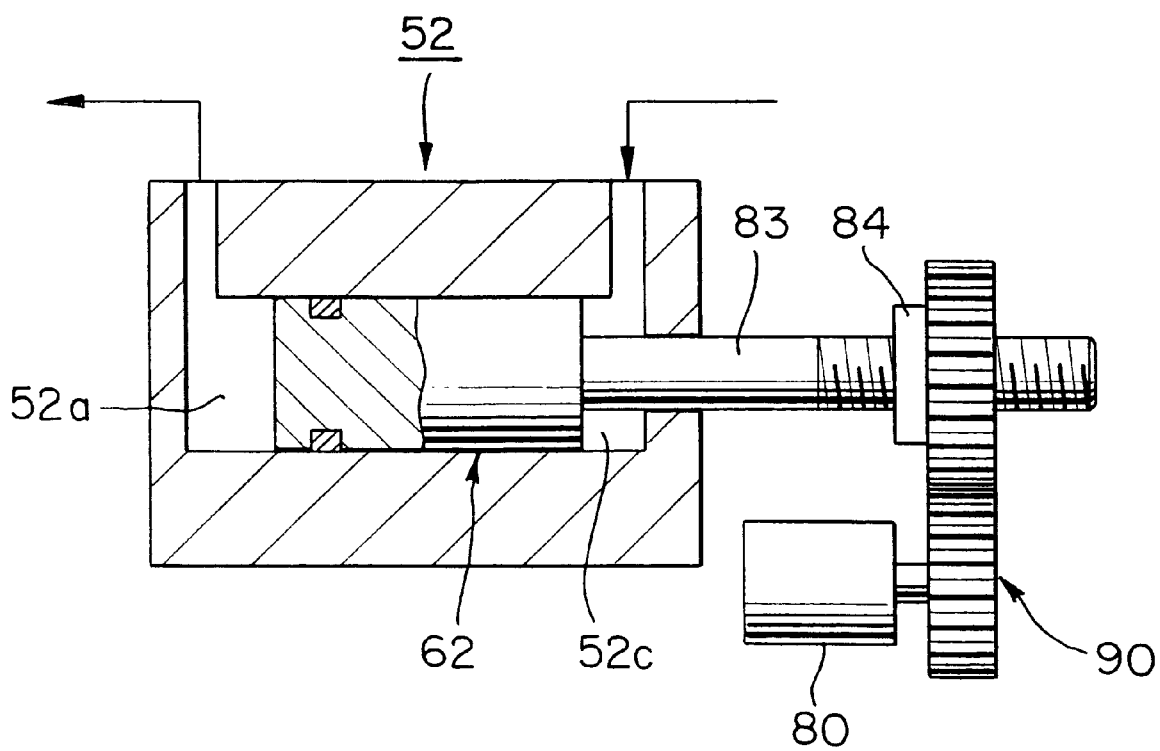
FIG. 8 is an enlarged sectional view of a pressure controller in a modification of the pressure controller shown in FIG. 7.

FIG. 8 is an enlarged sectional view of a modified pressure controller 52 shown in FIG. 7. The pressure controller 52 shown in FIG. 8 employs a servomotor 80 instead of the linear motor 60 shown in FIG. 7.

Referring to FIG. 8, a piston used as a pressure applying member 62 is fitted in a pressure chamber 52a formed in a cylinder of the pressure controller 52. A threaded rod 83 is connected to one end of pressure applying member 62 facing the back pressure chamber 52c. An internally threaded nut 84 is linked to the threaded rod 83 and is interlocked with the drive shaft of the servomotor 80 by a gear train 90.

The function and effect of the pressure controller 52 employing the servomotor 80 for driving the pressure applying member 62 are the same as those of the pressure controller 52 employing the linear motor 60.

Third Embodiment

Figure 9:
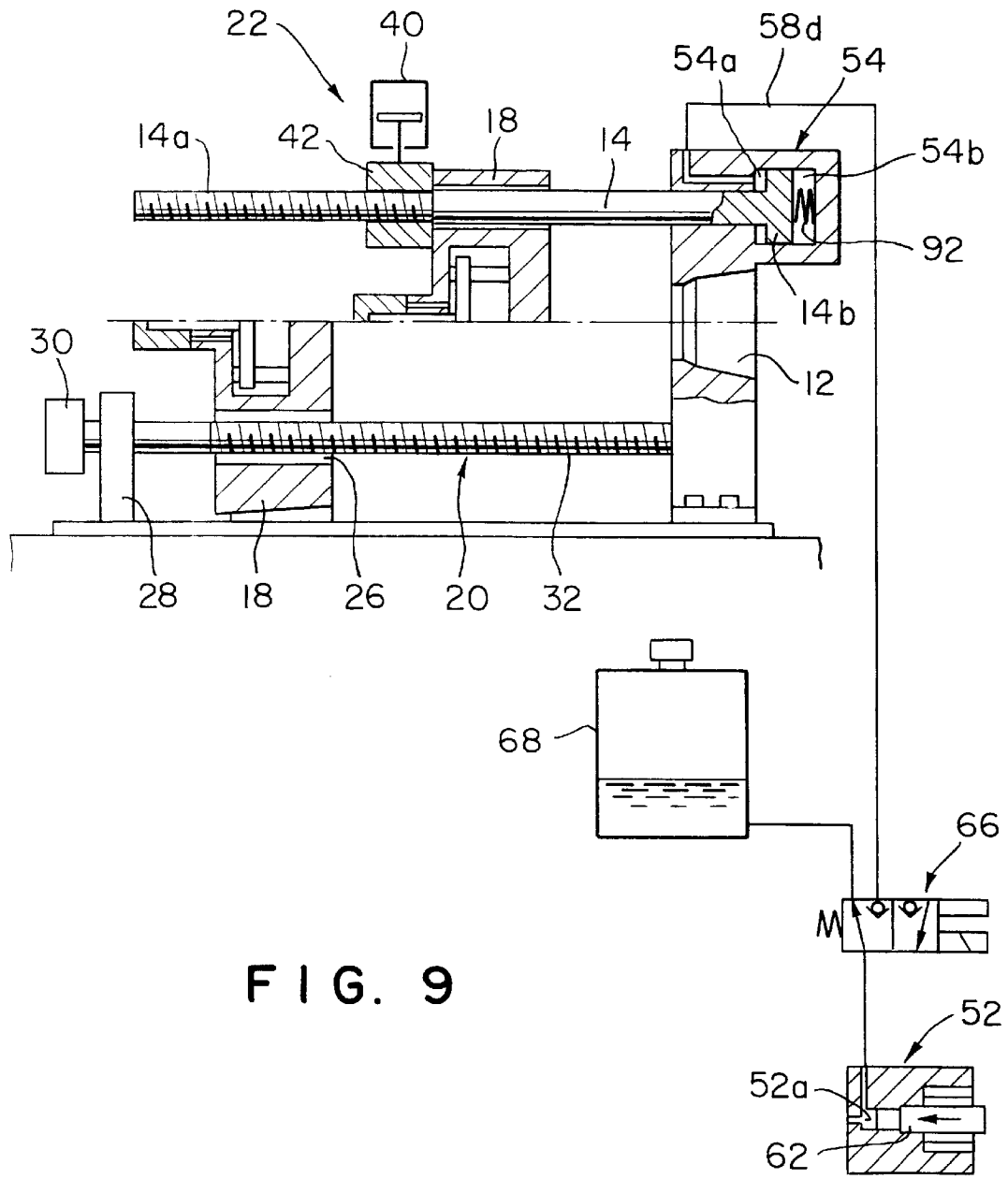
FIG. 9 is a schematic view of a mold clamping apparatus in a third embodiment according to the present invention for an injection molding machine.

A mold clamping apparatus in a third embodiment according to the present invention for an injection molding machine, shown in FIG. 9 is the same in constitution as the mold clamping apparatus shown in FIG. 1 except only a clamping force applying unit. Therefore, parts shown in FIG. 1 like or corresponding to those shown in FIG. 1 are designated by the same reference characters and the description thereof will be omitted.

Referring to FIG. 9, an elastic member 92 for returning the piston 14b is placed in the chamber 54b of the cylinder of the sealed hydraulic cylinder actuator 50 to force the piston 14b toward a pressure chamber 54a through which the tie bar 14 extends. A line 58d connected to the pressure chamber 54a and provided with the nonleakage valve 66 is connected to the pressure chamber 52a of the pressure controller 52.

When the nonleakage valve 66 is not achieved by a solenoid, the nonleakage valve retains the pressure in the pressure chamber 54a and communicates the pressure chamber 52a with the reservoir tank 68. The reservoir tank 68 replenishes the hydraulic circuit with the hydraulic fluid immediately before starting a claiming operation. When the nonleakage valve 66 is actuated by the solenoid, the nonleakage valve 66 shuts off a line 68a connected to the reservoir tank 68 and communicate the pressure chamber 54a with the pressure chamber 52a.

A pressure applying member 62 is driven for axial movement by a linear motor 60. The pressure applying 62 applies a increased hydraulic pressure to the piston 14b to convert the hydraulic pressure into a clamping force which is large enough for pulling the tie bars 14 to clamp the mold.

In this mold clamping mechanism, the pressure controller 52 is provided with the linear motor 60 and the pressure chamber 54a is sealed with sealing members 72.

It is noted that the servomoter 80 shown in FIG. 8 is applicable to the driving means for the pressure applying member 62 instead of the linear motor 60.

Fourth Embodiment

Figure 10A:
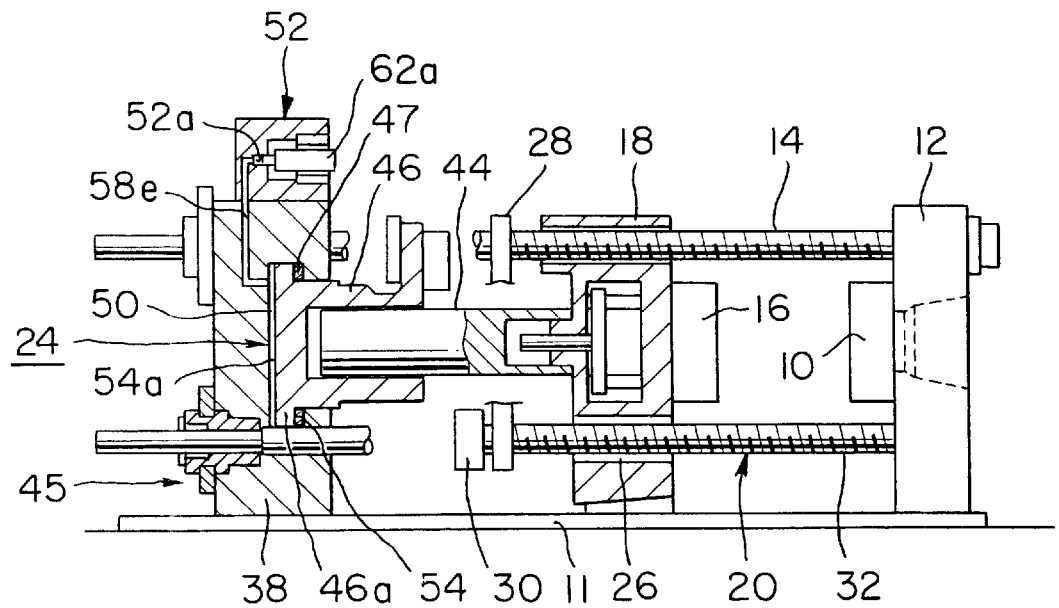
FIGS. 10(a) and 10(b) are schematic sectional views of a mold clamping apparatus in a fourth embodiment according to the present invention for an injection molding machine, in a mold opening state and in a mold clamping state, respectively.
Figure 10B:
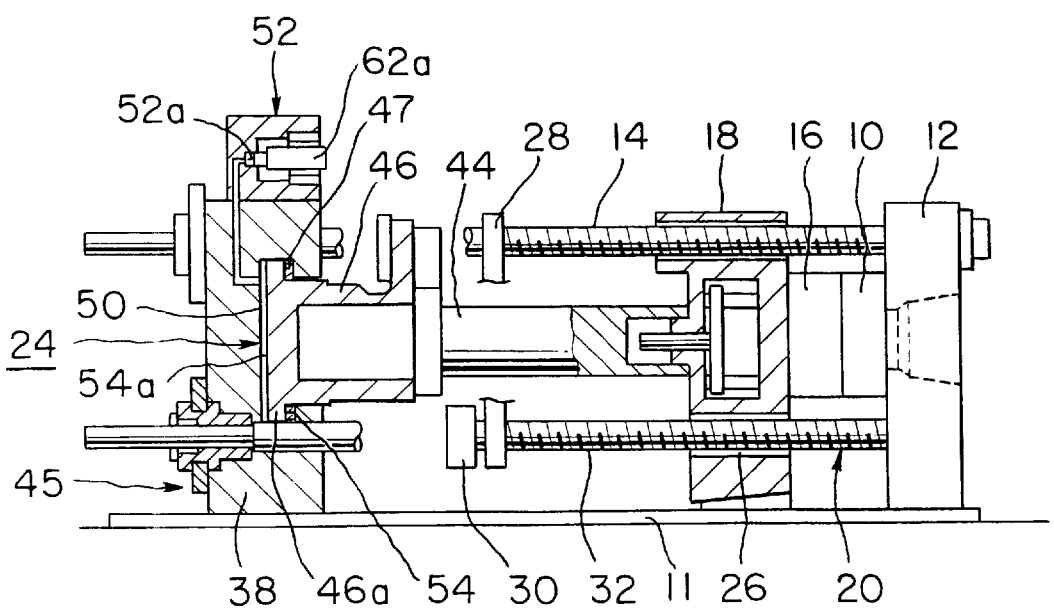

FIGS. 10(a) and 10(b) show a mold clamping apparatus in a fourth embodiment according to the present invention for an injection molding machine in a mold opening state and in a mold clamping state, respectively.

The mold clamping apparatus in the fourth embodiment comprises, as basic components, a stationary platen 12 holding a stationary mold 10, a movable platen 18 for holding a movable mold 16 which is disposed opposite to the stationary platen 18 and is guided for longitudinal movement toward and away from the stationary platen 12 by tie bars 14, a movable platen driving unit 20 for moving the movable pattern forward and backward along the tie bars 14, and a mold clamping ram 44 extended between the movable platen 18 and a rear mount plate 38 disposal behind the movable platen 18.

The rear mount plate 38 can be fixed to a base at an appropriate longitudinal position. The longitudinal position of the rear plate 38 along the tie bars 14 the adjustable according to the thickness of a mold to be used on the injection molding machine by means of position adjusting mechanisms 45 interlocked with the tie bars 14. A ram support member 46 supports the mold clamping ram 44 axially movably therein and has a piston section 46a at one end thereof. A cylinder bore 54 which constitutes a hydraulic cylinder actuator 50 is confined in the rear mount plate 38. The piston section 46a of the ram support member 46 is fitted in the cylinder bore 54 which is sealed by a sealing bag 47.

A Clamping force applying unit 24 includes the hydraulic cylinder actuator 50, the piston section of the mold clamping ram 44 and pressure controller 52. The pressure controller 52 may be of a construction similar to that of any one of the pressure intensifying units 24 employed in the first to the third embodiment.

In the fourth embodiment, a pressure controller 52 is built in the rear mount plate 38. A pressure chamber 52a included in the pressure controller 52 is connected to a pressure chamber 54a in which a hydraulic pressure is built up by a line 58e.

In operation for closing the mold, the threaded rods 32 are driven for rotation to advance the movable platen 18 together with the mold clamping ram 44 toward the stationary platen 12 so that the movable mold moves quickly to the stationary mold 10, when the movable mold 16 is on the point of stopping against the stationary mold 10, the pressure controller 52 is actuated to move the pressure applying member 62a for pressure intensifying action. The pressure applying member 62a build up the hydraulic pressure in the pressure chamber 54a so that the piston section 46a applies the clamping force to the mold clamping ram 44 to clamp the movable mold 16 and stationary mold firmly together.

Fifth Embodiment

Figure 11A:
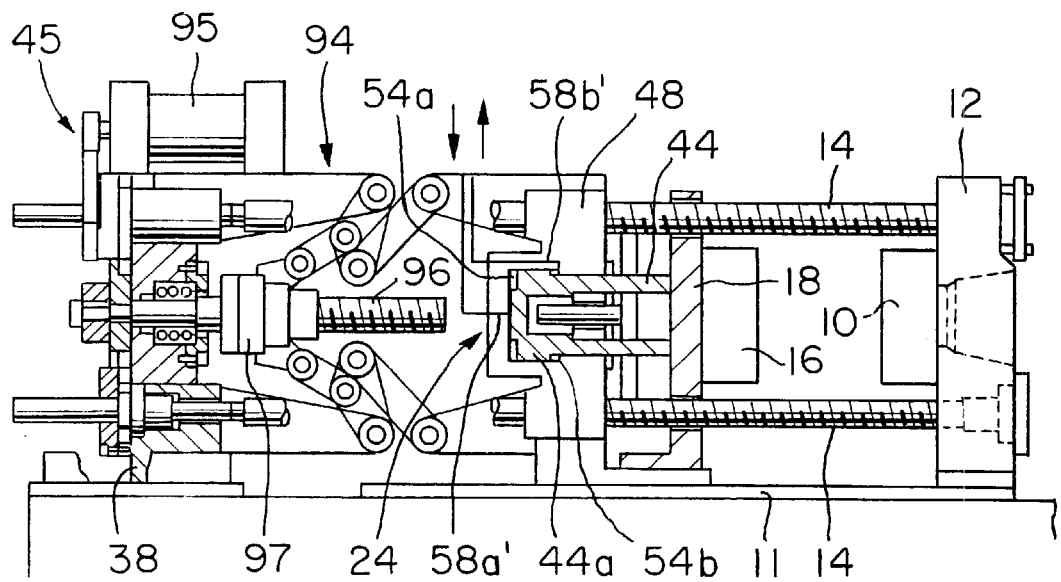
FIGS. 11(a) and 11(b) are schematic sectional views of a mold clamping apparatus in a fifth embodiment according to the present invention for an injection molding machine, in a mold opening state and in a mold clamping stage, respectively.
Figure 11B:
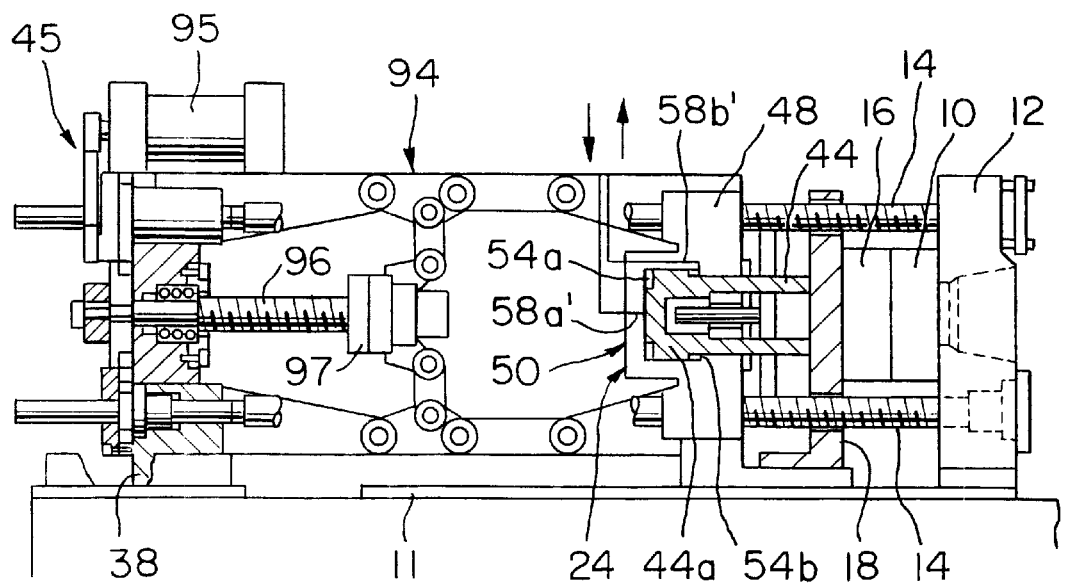

FIGS. 11(a) and 11(b) show a mold clamping apparatus in a fifth embodiment according to the present invention for an injection molding machine, in a mold opening state and in a mold clamping state, respectively.

The mold clamping apparatus in the fifth embodiment comprises, as basic components, a stationary platen 12 for holding a stationary mold 10, a movable platen 18 for holding a movable mold 16 which is disposed opposite to the stationary platen 12 and is guided for longitudinal movement toward and away from the stationary platen 12 by tie bars 14, an intermediate mount plate 48 disposed behind the movable platen 18, a mold clamping ram 44 extended between the movable platen 18 and the intermediate mount plate 48, a pair of toggle mechanisms 94 for moving the movable platen forward and backward along the tie bars 14.

The mold clamping ram 44 has a piston section 44a at a rear end thereof. A cylinder bore which constitutes a sealed hydraulic cylinder actuator 50 is confined in the intermediate mount plate 48. The piston section 44a of the mold clamping ram 44 is fitted in the cylinder bore which is divided into a pressure chamber 54a and a back pressure chamber 54b.

The toggle mechanisms 94 are mounted between the intermediate mount plate 48 and a rear mount plate 38. The rear mount plate 38 can be fixed to a base at an appropriate longitudinal position. The longitudinal position of the rear plate 38 along the tie bars 14 is adjustable according to the thickness of a mold to be used on the injection molding machine by means of position adjusting mechanisms 45 interlocked with the bars 14. A toggle mechanism driving unit involves a motor 95 mounted on the rear mount plate 38. The motor 95 drives a ball screw 96 which is rotatably supported in the rear mount plate 38. A nut 97 engaged with the ball screw 96 is connected to toggle link members of the toggle mechanism 94.

A Clamping force applying unit 24 includes the sealed hydraulic cylinder actuator 50, the piston section 44a of the mold clamping ram 44 and pressure controller. The pressure controller may be of a construction similar to that of any one of the pressure controller 52 employed in the first to the third embodiment.

In the fifth embodiment, the pressure chamber 54a and the back pressure chamber 54b are communicated with the pressure controller, not shown, by lines 58a and 58b formed in the intermediate mount plate 48.

In operation for closing the mold, the mechanisms 94 are driven for stretch to advance the movable platen 18 together with the mold clamping ram 44 toward the stationary platen 12 so that the movable mold moves quickly to the stationary mold 10, when the movable mold 16 is on the point of stopping against the stationary mold 10, the pressure controller (not shown) build up the hydraulic pressure in the pressure chamber 54a so that the piston section 46a applies the clamping force to the mold clamping ram 44 to clamp the movable mold 16 and stationary mold firmly together.

Although the invention has been described in its preferred embodiments with a certain degree of particularly, obviously many changes and variations are possible therein. It is therefore to be understood that the present invention may be practiced otherwise than as specifically described herein without departing from the scope and spirit thereof.

What is claimed is:

1. A mold clamping apparatus for an injection molding machine, for closing and opening a mold including a stationary mold and a movable mold and for clamping the mold closed, said mold clamping apparatus comprising:

a stationary fixedly holding the stationary mold;

a movable platen fixedly holding the movable and disposed opposite to the stationary platen;

tie bars for connecting the movable platen to the stationary platen in a manner that the movable platen moves toward and away from the stationary platen;

an intermediate mount plate disposed behind the movable platen and movable along the tie bars;

a rear mount plate fixedly disposed behind the intermediate mount plate;

a toggle mechanism interconnecting the intermediate mount plate and the rear mount plate to move the intermediate mount plate, said toggle mechanism being electrically driven to move the intermediate mount plate forward and back along the tie bars to close and open the mold;

a mold clamping ram extending between the intermediate mount plate and the movable platen to exert a mold clamping force on the movable platen; and clamping force applying means for applying an intensified mold clamping force to the molds, said clamping force applying means including:

a hydraulic cylinder actuator having a cylinder bore formed in the intermediate mount plate;

a piston section formed on a rear end of the mold clamping ram and fitted in the cylinder bore;

a pressure intensifier having therein an intensifier pressure chamber communicating with the hydraulic cylinder actuator;

a pressure applying member fitted in the intensifier pressure chamber to apply pressure to hydraulic fluid in the intensifier pressure chamber; and a pressure applying member driving means that is electrically driven to axially shift pressure applying member.

2. The mold clamping apparatus according to claim 1, wherein the pressure intensifier comprises:

a pressure controller having a body defining the intensifier pressure chamber and capable of controlling hydraulic pressure to be applied to the hydraulic cylinder actuator; and a line connecting the intensifier pressure chamber to the cylinder bore of the hydraulic cylinder actuator.

3. The mold clamping apparatus according to claim 1, wherein the movable platen driven means comprises:

a motor having an output shaft;

threaded shafts each having one end part supported in a bearing on the rear mount plate and another end part extending parallel to the tie bars;

nuts each having a threaded bore, said nuts each being connected with the toggle mechanism with the threaded shafts extending through respective nuts; and a transmission mechanism for transmitting rotation of the output shaft of the motor to the threaded shafts to cause the threaded shafts to rotate.

4. The mold clamping apparatus according to claim 1, wherein the pressure applying member driving means comprises a servomotor and a ball screw mechanism for converting rotational output of the servomotor into linear movement of the pressure applying member.

* * * * *